(12) United States Patent
Ballu

(10) Patent No.: US 9,296,604 B2
(45) Date of Patent: Mar. 29, 2016

(54) SYSTEM AND METHOD FOR FILLING A SPRAYER TANK

(75) Inventor: Patrick Ballu, Reims (FR)

(73) Assignee: EXEL Industries, Epernay (FR)

( * ) Notice: Subject to any disclaimer, the term of this patent is extended or adjusted under 35 U.S.C. 154(b) by 522 days.

(21) Appl. No.: 13/817,705

(22) PCT Filed: Aug. 22, 2011

(86) PCT No.: PCT/FR2011/051941
§ 371 (c)(1),
(2), (4) Date: May 3, 2013

(87) PCT Pub. No.: WO2012/025686
PCT Pub. Date: Mar. 1, 2012

(65) Prior Publication Data
US 2013/0206278 A1    Aug. 15, 2013

(30) Foreign Application Priority Data

Aug. 23, 2010    (FR) ...................................... 10 56710

(51) Int. Cl.
*B67D 7/74*    (2010.01)
*A01M 7/00*    (2006.01)

(52) U.S. Cl.
CPC ............. *B67D 7/743* (2013.01); *A01M 7/0085* (2013.01)

(58) Field of Classification Search
CPC ... A01M 7/0085; A01M 7/0092; B01F 5/043; B01F 13/0035; B01F 13/0037; B01F 13/004
USPC ........... 141/18, 100–107, 231, 236, 248, 302; 239/148, 172; 366/263, 163.2
See application file for complete search history.

(56) References Cited

U.S. PATENT DOCUMENTS

| 3,976,087 | A  |   | 8/1976 | Bolton et al. |
| 5,609,417 | A  | * | 3/1997 | Otte .............................. 366/137 |
| 5,628,431 | A  |   | 5/1997 | Roach et al. |
| 6,345,772 | B1 |   | 2/2002 | Bastin et al. |
| 2004/0084551 | A1 | * | 5/2004 | Vickers et al. .................. 239/69 |
| 2007/0036024 | A1 | * | 2/2007 | Kubala et al. .............. 366/163.2 |

FOREIGN PATENT DOCUMENTS

| EP | 1 415 535 A1 | 5/2004 |
| FR | 2 714 572 A1 | 7/1995 |

* cited by examiner

*Primary Examiner* — Timothy L Maust
*Assistant Examiner* — Timothy P Kelly
(74) *Attorney, Agent, or Firm* — Arent Fox LLP

(57) ABSTRACT

The present invention relates to a system for filling a sprayer tank with at least one liquid solution, including at least a first tank containing a first liquid solution and a second tank configured to contain a second liquid solution, means for temporarily connecting the system to the tank, means for incorporating an active material into the first tank or between the first tank and the connecting means, and pumping means controlled by a control device and configured to selectively fill the tank with the liquid solution(s). The system also includes means for preparing the first liquid solution in the first tank by mixing the second solution and the active material in predetermined proportions. The means for preparing the first liquid solution include at least the means for incorporating the active material, which are positioned between the first tank and the second tank, as well as agitation means configured to ensure that the first liquid solution remains a suspension in the first tank.

15 Claims, 5 Drawing Sheets

SYSTEM AND METHOD FOR FILLING A SPRAYER TANK

CROSS-REFERENCED TO RELATED APPLICATIONS

This application is a National Stage entry of International Application PCT/FR2011/051941 filed Aug. 22, 2011, which claims priority to French Application No. 10 56710, filed Aug. 23, 2010, the disclosure of these prior applications are hereby incorporated in their entirety by reference.

BACKGROUND

This invention relates to a system for filling a sprayer cistern. The invention also relates to a method for filling a sprayer cistern. The field of the invention is that of equipment intended for towed, mounted or self-propelled agricultural sprayers.

In this field, it is sought to increase the output of sprayers, in particular on farms of substantial size. In practice, it is sought to reduce the time for incorporating active material and for filling the cistern of a sprayer, as well as the travel time of the sprayer without spraying, to the benefit of actual spraying time in the field or orchard.

To do this, in a known manner, a certain quantity of active material is poured directly into a sprayer cistern, or is poured into a system for preparing an active concentrate which is in turn poured into the cistern.

FR-A-2 878 243 describes a system for filling a sprayer cistern, comprising a unit for supplying water, a control device, hydraulic valves and a device for detecting the filling level of the cistern. The active material is incorporated into the cistern, then the system pours therein the complement in water. When the device for detecting detects that the predetermined level of liquid is reached inside the cistern, it sends a signal to the control device in order to trigger the closing of the valves.

EP-A-1 415 535 describes a system for filling a sprayer cistern, comprising a first tank containing water, a second tank containing a chemical, as well as a device for coupling the system to the cistern. The second tank can be subdivided into several compartments containing various chemicals. The system further comprises pumping means controlled by a control device and configured to selectively fill the cistern with the liquid solutions, i.e. water and/or the chemicals. However, the system is not adapted for preparing a concentrated mixture in one of the tanks by mixing the water and the chemicals in predetermined proportions.

The known filling methods are long to implement and require many manipulations, in particular for the preparing of the concentrated mixture and/or for the filling of the sprayer cistern. In addition, the sprayer is immobilised during a substantial length of time during its filling. Also, the sprayer is forced to be displaced to the water or mixture tank in order to fill the cistern when the latter is empty, which is an additional loss of time.

The purpose of this invention is to overcome the problems of prior art.

In particular, the invention aims to jointly reduce the time for preparing the active concentrate and the filling time of the cistern.

BRIEF SUMMARY

To this effect, the invention relates to a system for filling defined in claim 1.

The invention also relates to a method for filling defined in claim 12.

As such, the invention makes it possible to reduce the filling time of the cistern, in particular by reducing the manipulations and by preparing the active concentrate in masked time. Indeed, the active material is incorporated before the filling, without immobilising the sprayer and with a controlled concentration. In other words, the sprayer is supplied with a broth or a concentrated mixture that is ready to be sprayed. The means for preparing the concentrated mixture allow for a fast and effective preparation of this mixture, maintained in suspension while waiting to be sprayed. Then, the filling of the cistern is carried our quickly and without interruption using pumping means, in particular a centrifugal pump. Furthermore, these pumping means make it possible to choose the liquid filling solution or solutions, among which is at least the active concentrated mixture.

More preferably, the system for filling is mobile, for example mounted on a trailer. As such, the system for filling can be displaced on the trailer in order to follow or join the sprayer at the edge of the field, while the active concentrate is already prepared, and proceed with the filling of the cistern as soon as required. Moreover, providing a system for filling that is separate from the sprayer makes it possible to use this system for several sprayers, in particular primarily in masked time.

Alternatively, the system for filling comprises a water tank which can be disconnected from the other elements constituting the system, in particular means for preparing and for storing active materials. As such, the water tank can be transported over a great distance for its filling. Advantageously, at the same time, the concentrated mixture prepared beforehand in the system is ready to be sprayed.

Other advantageous characteristics of the system according to the invention, taken separately or in combination, are specified in claims 2 to 11.

Other advantageous characteristics of the system according to the invention, taken separately or in combination, are specified in claims 13 to 15.

BRIEF DESCRIPTION OF THE DRAWINGS

The invention will be better understood when reading the following description, provided solely as a non-restricted example and given in reference to the drawings wherein.

DETAILED DESCRIPTION

Figure 1:
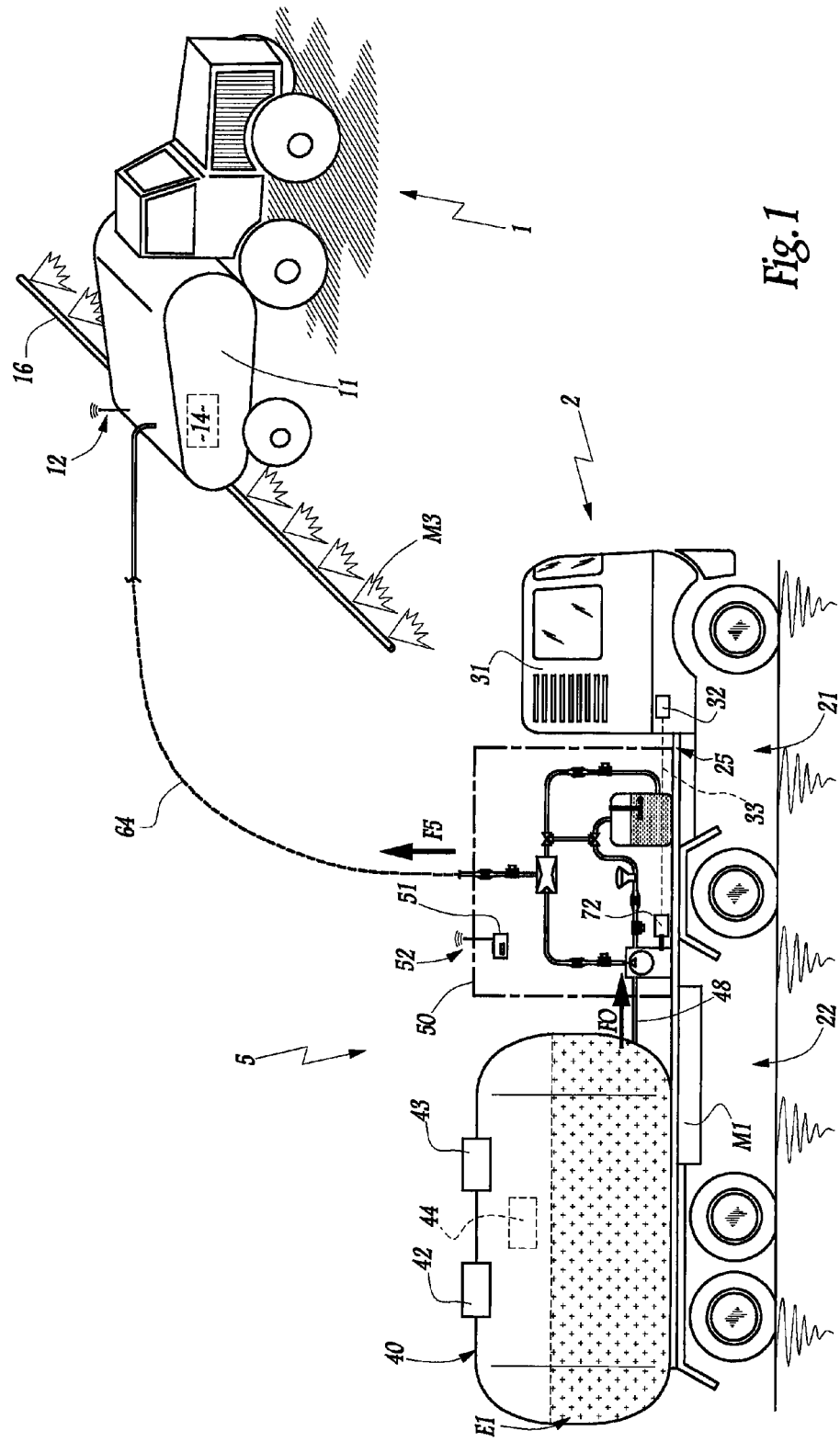
FIG. 1 is a diagrammatical drawing of a sprayer vehicle comprising a cistern and of a semi-trailer vehicle comprising a system for filling, in accordance with the invention, the sprayer cistern.
Figure 2:
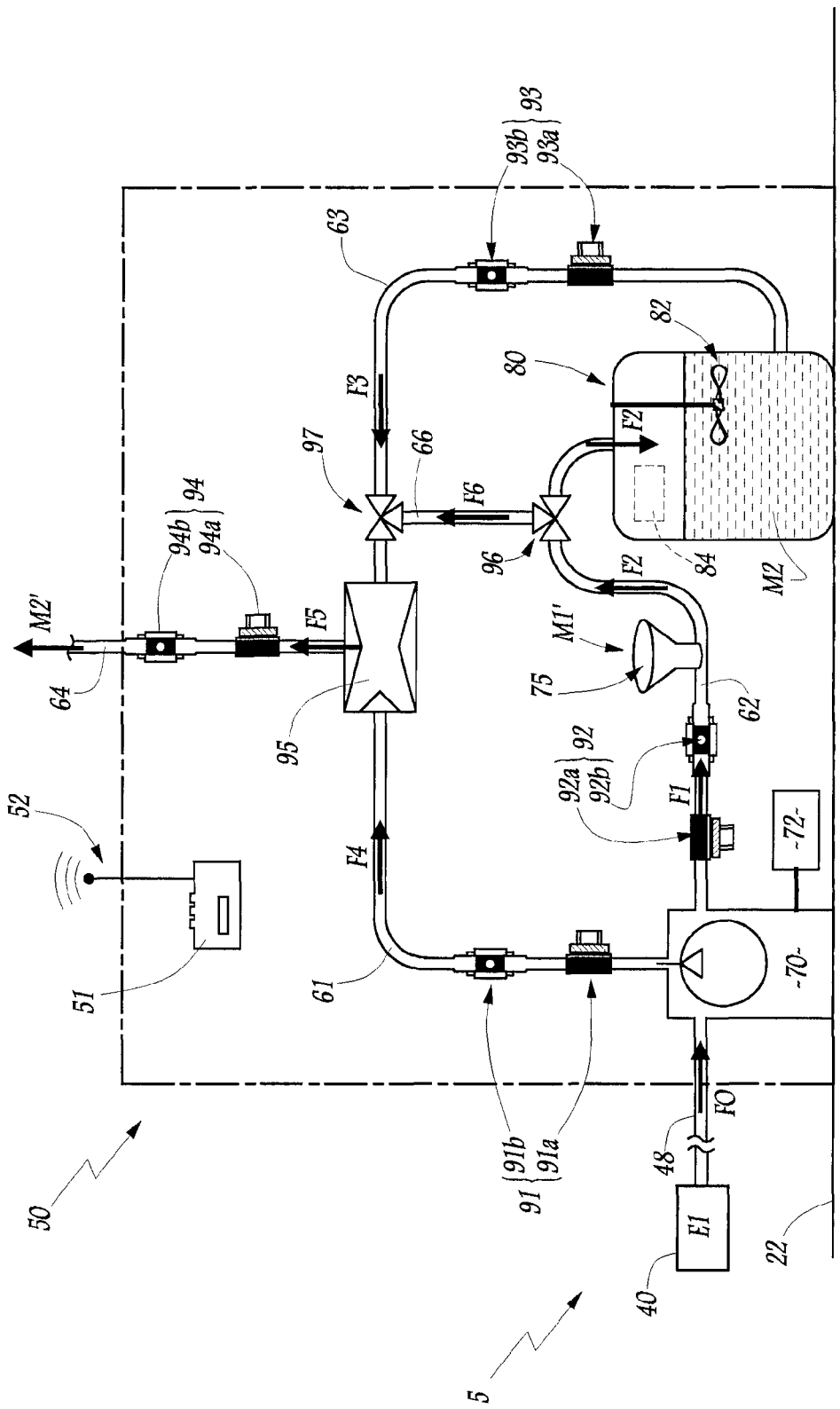
FIG. 2 is a diagrammatical drawing on a larger scale of a unit for preparing and for filling belonging to the system for filling in FIG. 1.

FIGS. 1 and 2 show a system 5 for filling a cistern 11.
This cistern 11 is arranged on a sprayer vehicle 1 of the farming tractor type, while the system 5 is arranged on a semi-trailer vehicle 2 comprising a front portion 21 and a rear portion 22. More preferably, each vehicle 1 or 2 is controlled by a dedicated operator.

The cistern 11 is provided to supply, with a product M3 ready to be sprayed, a sprayer boom 16 arranged on the vehicle 1. The cistern 11 has, for example, a capacity of 5,000 liters. A device 14 for detecting the filling level, shown as a dotted line in FIG. 1 and known per se, is positioned inside the cistern 11. A telecommunications antenna 12 is arranged on the cistern 11 and connected to the device 14. The antenna 12 is configured to remotely transmit information on the level of liquid contained in the cistern 11 and measured by the device 14, i.e. on the free volume of the cistern 11 for the purposes of its filling. The antenna 12 can also transmit other information, taken alone or as a combination, for example the position of the vehicle 1 in the field, or the liquid solution or solutions selected by the operator for the filling, or the desired concentration in active material in each solution.

The vehicle 2 constitutes a means for displacing the system 5, or at least a portion of the system 5. The front portion 21 of the vehicle 2 is motorised, of the farm tractor or road tractor type. The tractor 21 comprises a driver's cabin 31 surmounting an engine unit 32. In particular, the engine unit 32 of the tractor 21 can include a power take-off, not shown in FIG. 1. This power take-off is a mechanical part allowing the engine torque to be transmitted to another mechanical device, thanks to the rotation of a spline shaft whereon this device is nested.

Alternatively, the power take-off is hydraulic or electric. In practice, its energy comes from the tractor 21, which must constantly remain in place.

According to another alternative, the power take-off can be replaced with a heat engine carried on the trailer 22, thus becoming autonomous.

The rear portion 22 is a trailer that rests in a removable manner on the tractor 21, on a saddle 25 which constitutes a substantially planar interface surface. When the trailer 22 is unhitched from the tractor 21, it can be supported on the ground by the intermediary of two stands not shown. As such, the trailer 22 can remain in place in the field while the tractor 21 is displaced, and can leave the field in order to tow another trailer analogous to the trailer 22.

In an alternative not shown, the trailer 22 does not comprise a saddle 25. In this case, the trailer can be towed using a hook or a ring, and locked into position by locking members.

On the trailer 22 are mounted a tank 40 containing water E1, a reserve of active material M1, and a unit 50 for preparing and for filling.

Figure 4:
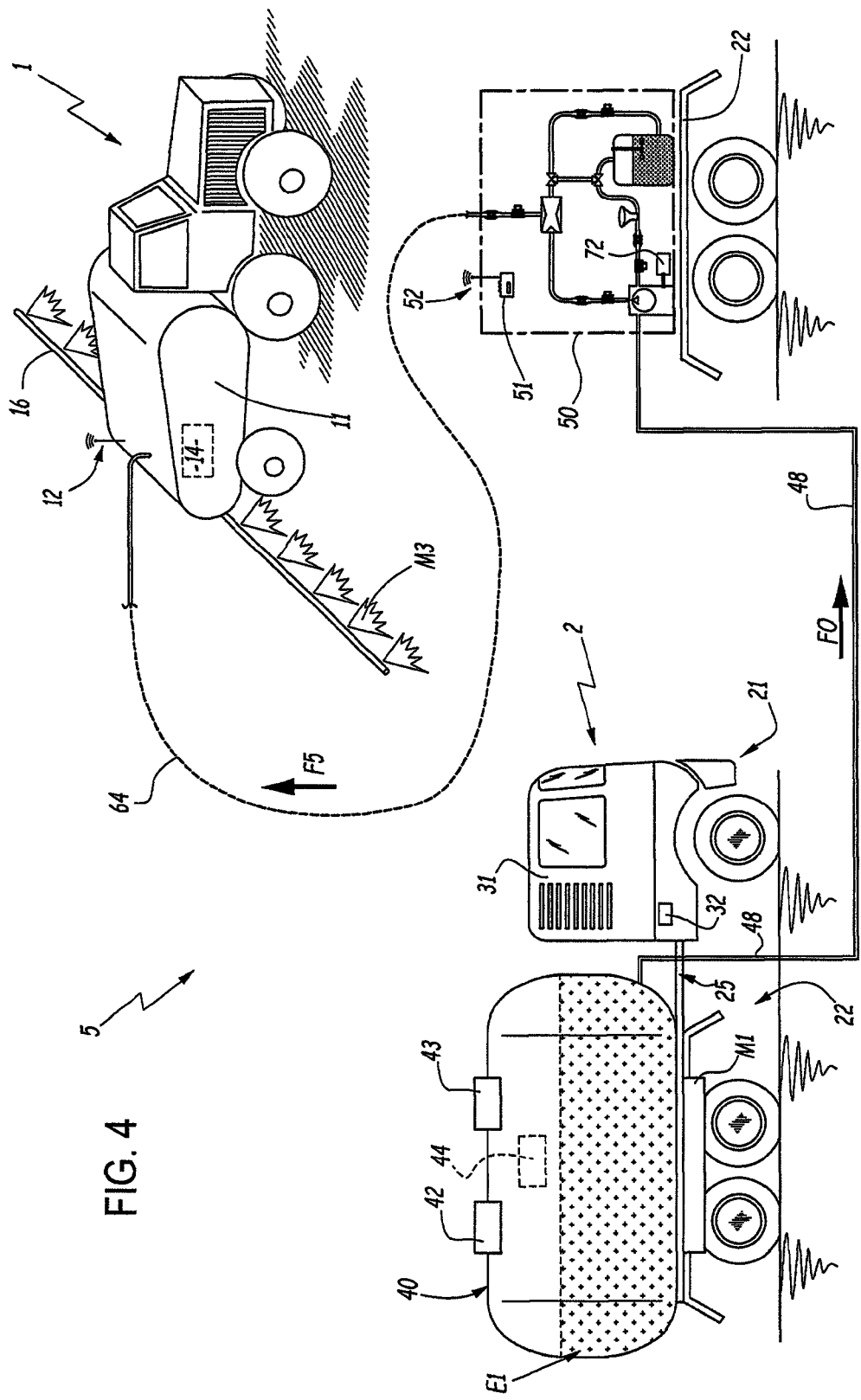
FIG. 4 is a is a diagrammatical drawing of a sprayer vehicle comprising a cistern and of a semi-trailer vehicle and of a system for filling, in accordance with the invention.

In an alternative shown in FIG. 4, the tank 40 and the unit 50 can be mounted on separate trailers 22. In this case, the tractor 21 can be displaced in order to recover another tank 40, while the unit 50 remains in place in the field.

Moreover, the reserve of active material M1 can be arranged at various locations of the vehicle 2, or even outside of the vehicle 2, while still being easily accessible and protected from inclement weather. For example, the material M1 can be in the form of containers, sacs or drums stacked on the floor of the trailer 22 at the back of the cabin 31, or arranged in a compartment under the floor of the trailer 22, as shown in FIG. 1. In practice, the material M1 is a phytosanitary product used to care for or prevent plant diseases, for example a pesticide, an insecticide, a herbicide and/or fertiliser.

The tank 40 has devices 42 and 43 provided for its filling, which comprise for example access openings provided with covers. A device 44 for detecting the filling level, shown as a dotted line in FIG. 1, is positioned inside the tank 40. The tank 40 is connected to the unit 50 by a line 48, which preferably has a hydraulic or electric valve, not shown. The capacity of the tank 40 in water E1 is for example 35,000 liters, for a total laden weight of the vehicle 2 less than 44 tonnes.

In FIG. 1, the vehicles 1 and 2 are connected by a connecting line 64 in order to allow for the filling of the cistern 11 by the system 5. This connecting line 64 (together with device 94 referred herein as a means for temporarily connecting) is a flexible pipe having connection elements of the fireman's connection type, not shown, at one of its ends at least, in such a way that the resulting connection between the system 5 and the cistern 11 is temporary and removable.

However, in practice, the unit 50 can operate without the vehicle 1 connected to the vehicle 2 by the line 64, and without vehicle 1 being located in the vicinity of the vehicle 2. On the contrary, advantageously, the unit 50 is adapted to incorporate the material M1 into the system 5 and prepare a concentrated mixture M2 when the vehicle 1 is far from vehicle 2. Preparing the mixture M2, prior to the filling, allows time to be saved during the filling properly speaking.

As can be seen in FIG. 2, the unit 50 comprises a control device 51, a pump 70 driven by an actuator 72, an inductor 75 of the active material M1, a mixing tank 80 provided with a stirrer 82 and a device for detecting the level 84, a Venturi air aspirator 95, as well as hydraulic devices 91, 92, 93, 94, 96 and 97 for controlling the flows of liquid F1, F2, F3, F4, F5 and F6 in different lines 61, 62, 63, 64 and 66.

The control device 51 is connected by electric cables, not shown, to each of the aforementioned elements constituting the unit 50. In practice, the control device 51 is configured to each control these elements 70, 72, 75, 82, 84, 91, 92, 93, 94, 95, 96 and 97.

Moreover, the control device 51 is provided with a telecommunications antenna 52 adapted to receive signals coming from the antenna 12 of the cistern 11, for example in order to receive an order to prepare a concentrated mixture M2 or to know the free volume of the cistern 11. As such, the system 5 can know the filling needs of the cistern 11, and control each element of the unit 50 in an adapted and anticipated manner, before the tractor 1 is in the vicinity of the vehicle 2, i.e. while the tractor sprays the product M3 with its boom 16. The use of additional wireless means of communication, i.e. antennas 12 and 52, therefore make it possible to simplify the implementation of the system according to the invention and to reduce the time required to proceed with the filling operations. The wireless means of communication can use a hertz, infrared or wifi system or any other adapted system.

The pump 70 is a centrifugal pump, known per se. Such a pump 70 has a substantial flow and is adapted to transfer approximately 2,000 liters of liquid solution per minute. The actuator 72 is, more preferably, a hydraulic motor which is driven by a pump, which is coupled to the power take-off provided on the engine unit 32 of the tractor 21 by a coupling device 33, shown as a dotted line in FIG. 1.

Alternatively, the pump 70 can be driven electrically, hydraulically or mechanically by an actuator which is arranged on the trailer 22. This actuator is for example of the heat engine type, electric motor or generator assembly. In this case, the pump 70 and the actuator 72 are independent of the tractor 21, which can go and recover another tank similar to the tank 40 without preventing the operation of the unit 50.

In an alternative not shown, the pump 70, or another similar pump, is also provided to provide for the filling of the tank 40, using a source of water (a tank, a pond or a river), by modifying its aspiration (direct from the source of water) and its discharge (direct to the tank 40) by the intermediary of valves, also not shown but of which the operation is known per se.

In practice, the pump 70 is configured to receive a flow F0 of water E1 coming from the tank 40 by the intermediary of the line 48. This flow F0 can be distributed by the pump 70 between the flow F1 circulating in the line 62 and the flow F4 circulating in the line 61.

The line 61 is provided with a hydraulic control device 91 and connects the pump 70 to the Venturi air aspirator 95.

The line 62 is provided with a hydraulic control device 92 and the inductor 75 for the incorporation of active material M1 into the system 5, more precisely into the flow F1. This incorporation is manual and is shown by an arrow M1' in FIG. 2. Therefore, downstream of the inductor 75, the flux F2 containing the water E1 and the active material M1 circulated in the line 62 to the mixing tank 80. According to the product used as an active material M1, the inductor 75 can include a Venturi inductor device, a pump or other equipment adapted to its function.

Figure 5:
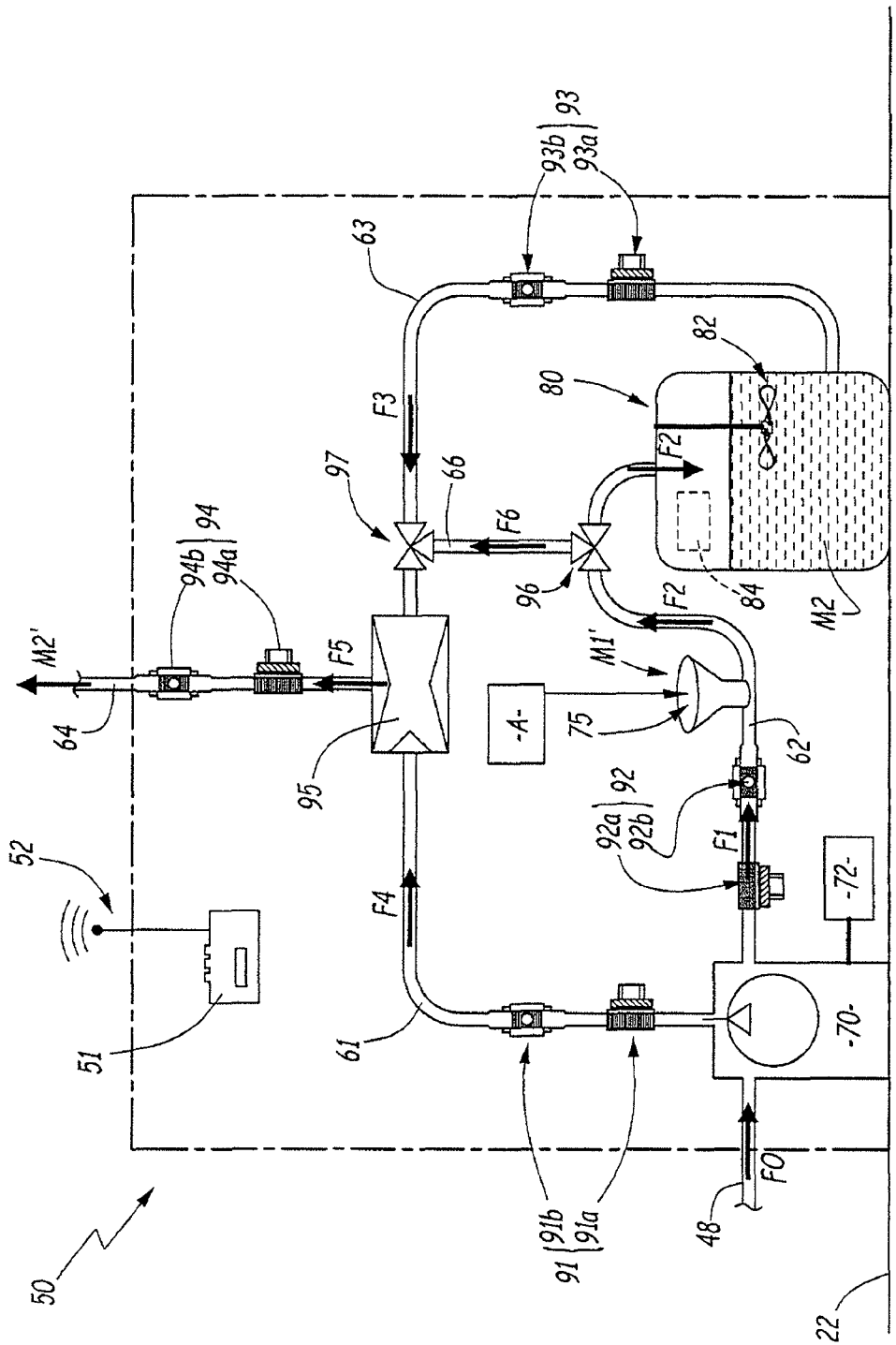
FIG. 5 is a is a diagrammatical drawing on a larger scale of a unit for preparing and for filling belonging to the system for filling in FIG. 4.

In an alternative shown in FIG. 5, a device A is provided to automatically transfer the material M1 into the inductor 75, with a controlled dosage. In this case, the incorporation is carried out without manual intervention, through a member controlled by the device 51.

The mixing tank 80, which has for example a capacity of 500 liters, receives the flow F2 of concentrated mixture M2 formed from water E1 and active material M1. At this stage, the concentration M1/E1 of the concentrated mixture M2 is known and controlled according to the quantity of active material M1 introduced into the inductor 75 and the quantity of water E1 pumped into the line 62 to the tank 80. More preferably, this concentration M1/E1 is equal to 10 times the concentration desired for the filling of the cistern 11 with product M3.

The stirrer 82 of the means for preparing is arranged in the mixing tank 80 and makes it possible to maintain the concentrated mixture M2 in suspension, while preventing foaming and the formation of deposits. The device 84 is adapted to constantly detect the level of liquid in suspension in the mixing tank 80, and therefore the volume of concentrated mixture M2 present in the mixing tank 80, and to inform the control device 51 of this.

The line 63, which is provided with the hydraulic control device 93 and wherein circulates the flow F3, connects the mixing tank 80 to the Venturi air aspirator 95.

In an alternative not shown, a centrifugal pump can be arranged on the line 63 at the output of the mixing tank 80 in order to pump the concentrated mixture M2 in the direction of the Venturi air aspirator 95 by forming the flow F3. In this case, this Venturi air aspirator 95 is not required and can be replaced with a 3-way valve or a simple Y connector.

This Venturi air aspirator 95 forms a confluing device, in other words means of confluing flows F3 and F4. In particular, the Venturi air aspirator 95 is configured to accelerate the flows F3 and F4 on a shrinking of the zone of fluid circulation. Furthermore, such a Venturi air aspirator 95 makes it possible to mix the liquids: the flow F4 of water E1 is depressurised in order to suck the flow F3 of concentrated mixture M2. By mixing together, the flows F3 and F4 form a flow F5 of diluted mixture M2', shows as an arrow in FIG. 2, which is sprayed into the line 64 in the direction of the cistern 11. In this case, the flows F3 and F4 are controlled by the corresponding hydraulic devices 91 and 93, as detailed hereinafter.

Each hydraulic device 91, 92, 93 and 94 has a valve, respectively 91a, 92a, 93a and 94, as well as a flow meter, respectively 91b, 92b, 93b and 94b. Each valve 91a to 94a can be opened and closed by the control device 51 in order to vary the flow of liquid in the corresponding line 61 to 64, and even cut off the corresponding flow of liquid F1 to F5. Each flow meter 91b to 94b is configured to measure the flow of liquid continuously and to inform the control device 51 of this.

More precisely, the device 91 makes it possible to control the flow F4 during the filling of the cistern 11. The device 92 makes it possible to control the flows F1 and F2 during the preparation of the concentrated mixture M2 in the mixing tank 80, and to cut them off is needed during the filling of the cistern 11. The device 93 makes it possible to control the flow F3 at the output of the mixing tank 80, in order to ensure that the desired quantity of concentrated mixture M2 is sent to the Venturi air aspirator 95, then in the direction of the cistern 11. The device 94 makes it possible to control the flow F5 of filling of the cistern 11, in particular to ensure that this filling is carried out only when the line 64 is connected to the cistern 11. Also, the device 94 makes it possible to cut off the flow F5 when the cistern 11 is correctly filled, and as such prevent the cistern 11 from overflowing.

In practice, the flow F5 directed to the cistern 11 can therefore contain water E1 when the valve 93a is closed, concentrated mixture M2 when the valves 91a and 92a are closed, or diluted mixture M2' when the valves 91a and 93a are open.

Advantageously but not mandatory, the unit 50 is provided with the line 66, as well as devices 96 and 97. More precisely, the device 96 is arranged on the line 62 between the inductor 75 and the tank 80, while the device 97 is arranged on the line 63 between the device 93 and the aspirator 95. These devices 96 and 97 are connected by the line 66 and each of them is formed by a 3-way valve. As such, the active material M1' poured into the inductor 75 can be transferred selectively into the mixing tank 80 according to the flow F2 or directly upstream of the aspirator 95 according to the flow F6 circulating in the line 66. This alternative makes it possible to incorporate, into the liquid E1 coming from the tank 40, active materials with a short lifespan once diluted, by mixing at the last moment the correct dose of active material M1 with the liquid E1. In this case, the drainage of the flow F2 can be channelled into the line 66 according to a draining of flow F6 without passing through the tank 80 of pre-concentrated mixture M2. Furthermore, the devices 91 and 92 and/or the device 94 are enough to measure and stop the filling of the cistern 11.

According to another alternative complementary to the preceding one, the device 97 and the aspirator 95 can be jointly replaced with a 4-way valve.

The unit 50 of the system 5 is therefore provided, on the one hand, for the preparing of the concentrated mixture M2 with water base E1 and active material M1 then, on the other hand, for the filling of the cistern 11 with a product M3 intended to be sprayed. However, the unit 50 is also able to pour into the cistern 11 only water E1, or only the concentrated mixture M2, or only the diluted mixture M2'.

As such, the unit 50 provided on the system for filling 5 allows for a very advantageous saving in terms of time, with the filling of the cistern 11 which is carried out in a single process without intermediate manipulations. Indeed, the cistern 11 is not filled solely with the concentrated mixture M2 in a first step, then with the water E1 as a complement in a second step. On the contrary, according to a fast filling method, the cistern 11 is filled with product M3 by first transferring the mixture M2', constituted by the sucking of the scheduled quantity of the pre-mixture M2 thanks to the Venturi 95 and to the flow of water F4 coming from the tank 40, then by adding the complement in water E1 without interruption or manipulation. According to a more progressive filling method, the mixture M2' is obtained by mixing in the Venturi air aspirator 95 and the line 64, directly during the filling, a predetermined quantity of water E1 and of mixture M2, for example 1/10 mixture M2 and 9/10 water E1, which in other terms corresponds to the deconcentrating of the pre-mixture M2.

At this stage, note that the system for filling 5 has "means for preparing" and "means for selecting", constituted respectively from a portion of the elements of the unit 50. More precisely, the means for preparing the concentrated mixture M2 include the elements 40, 50, 51, 70, 75, 80 and 92, while the means for selecting the liquid solution E1, M2, M2' (E1+M2) or M3 (M2' then E1) which is sent to the cistern 11 comprise the elements 50, 51, 70, 91, 93, 94, 95, 96 and 97.

Figure 3:
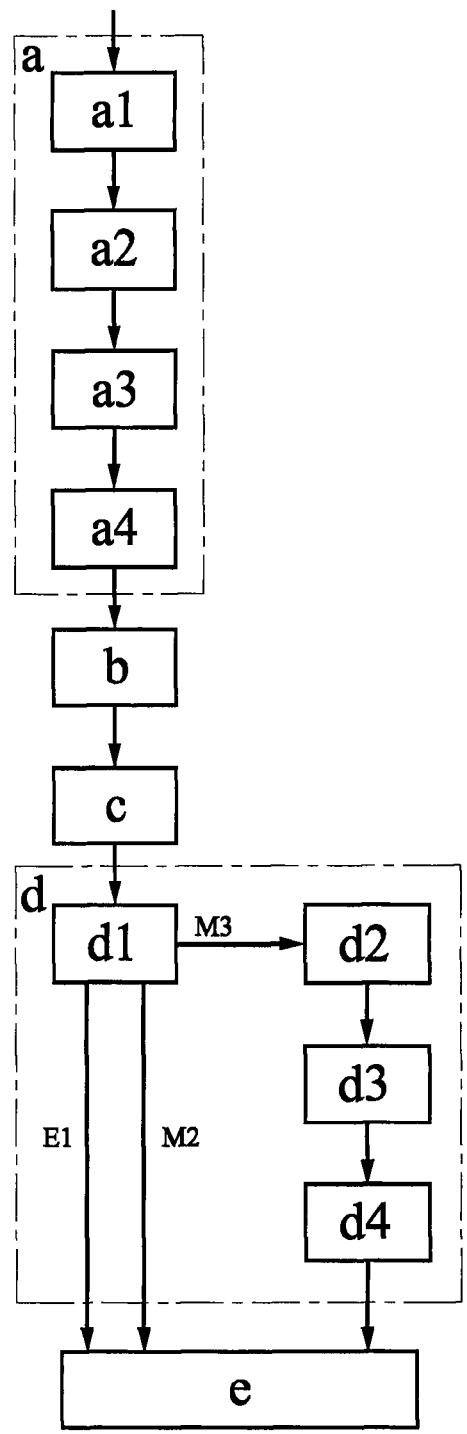
FIG. 3 is a logic diagram showing the various steps of a method for filling in accordance with the invention.

FIG. 3 shows a logic diagram of the method for filling the cistern 11 in accordance with the invention. In particular, this method is adapted to the implementation of the system for filling 5.

At this stage, note that the control device 51 provided for the system 5 is configured to receive signals coming from the cistern 11 through the intermediary of additional communications means 12 and 52, before or during the implementation of the method for filling the cistern. In particular, these signal scan transmit an order to prepare concentrated mixture M2 to the system 5, with this order initiating the method for filling according to the invention.

In a step "a", a certain quantity of active material M1, using the means for incorporating comprising the inductor 75, is incorporated into the system for filling 5. To this effect, the system 5 comprises a first tank, i.e. the mixing tank 80, as well as a second tank configured to contain a second liquid solution, i.e. the tank 40 containing the water E1. The active material M1 is incorporated into the mixing tank 80 configured to contain the concentrated mixture M2.

More precisely, this step a comprises the sub-steps a1, a2, a3 and a4.

In the step a1, an order to prepare concentrated mixture M2, adapted to filling the sprayer cistern 11, is transmitted to the control device 51 of the system for filling 5. This preparation order is transmitted by the operator of the sprayer vehicle 1, or automatically by the device 14, when the level of product M3 in the cistern 11 falls below a predetermined limit.

In the step a2, a predetermined quantity of active material M1 is incorporated into the system for filling 5, upstream of the first tank or in this first tank, i.e. the mixing tank 80. This incorporation is carried out manually by the operator of the vehicle 2, or automatically in the case where the reserve of active material M1 is connected to the inductor 75.

In the step a3, the pump 70 transfers a predetermined volume of the second liquid solution E1, which is preferably pure water, to the first tank 80.

In the step a4, the unit 50 of the system 5 prepares the concentrated mixture M2 in the first tank 80 by mixing the active material M1 and the second liquid solution E1 in predetermined proportions M1/E1. Moreover, in this step a4, the concentrated mixture M2 is stirred using the stirrer 82, in order to prevent foaming and the formation of deposits, until the sprayer arrives in the vicinity of the system 5 for the filling of the cistern 11.

In a step "b", one of the operators connects the system for filling 5 and the cistern 11 to be filled using means for connecting the system 5 to the cistern 11, i.e. the line 64.

In a step "c", a filling order is transmitted to the control device 51. This order is transmitted by one of the operators, or automatically in the case where the control device 51 is configured in order to detect that the connection between the system 5 and the cistern 11 is correctly carried out. The valve 94a is then open in order to allow for the passage of the flow F5 in the line 64 connecting the unit 50 and the cistern 11. The valves 91a and 93a are open or closed according to the liquid solution E1, M2 or MT selected for the filling of the cistern 11.

Moreover, it can be noted that the cistern 11 of the sprayer vehicle 1 is not always empty at the time of the reload. The dosage of the active material M1, which is incorporated into the system 5 but intended for the cistern 11, must therefore be controlled in order to optimise the mixtures M2 and/or M2'. Also, the flows F3, F4 and F5 must be controlled by the control device 51. For example, if the cistern 11 needs 4,000 liters of product M3, it has to be filled with 400 liters of concentrated mixture M2 prepared beforehand and 3,600 liters of water E1. These various aspects are provided for during the transmission of the preparation order of the step a1 and of the filling order of the step c.

Advantageously, the system 5 and the method for filling are adapted in order to carry out the step a prior to the step b. This allows a considerable amount of time to be saved since the active material M1 is already incorporated into the system 5, in other words the mixtures M2 or M103 are already prepared, at the moment when the filling is initiated in step c.

In a step "d", the control device 51 actuates pumping means 70 provided on the system for filling 5 and configured to selectively fill the cistern 11 with the liquid solution or solutions E1, M2, M2' (E1+M2) or M3 (M2' then E1) by the intermediary of the means for connecting 64. These pumping means include at least the centrifugal pump 70. Other pumps, not shown in FIGS. 1 and 2, can be integrated into the system 5 in order to facilitate the filling of the cistern 11 by controlling the flows F1, F2, F3, F4 and/or F5.

In practice, the first solution is the concentrated mixture M2, the second solution is pure water E1, and the third solution is the diluted mixture MT. In this case, the step d preferably comprises at least one sub-step d1 consisting in selecting the liquid solution E1, M2, M2' or M3 that is sent to the cistern 11 from among at least: the first liquid solution M2, the second liquid solution E1, and a third liquid solution MT which is a mixture of the first and second liquid solutions M2 and E1 in predetermined proportions M2/E1. In other words, the system 5 is configured to adapt to the filling needs of the cistern 11, as chosen by the operator. For example, the operator can control the rinsing by water E1, or the reloading with concentrated mixture M2 alone in order to increase the concentration in active material M1 in the cistern 11. However, the main application is the filling of the cistern 11 with product M3 at high speed, i.e. in less than three minutes, using the diluted mixture MT and the complement in water E1.

Furthermore, as can be seen in FIG. 3, when the liquid solution selected in the step d1 is the third liquid solution M2', the step d further comprises the sub-steps d2, d3 and d4 following the step d1.

In the step d2, the control device 51 actuates the pumping means 70 in order to fill the cistern 11 simultaneously with the mixture MT comprising the first liquid solution M2 and the second liquid solution E1. The Venturi air aspirator 95 makes it possible to mix the flows F3 and F4 in order to obtain the filling flow F5.

In the step d3, when the first tank 80 containing the first liquid solution M2 is empty or contains a predetermined level of liquid corresponding to the filling needs of the cistern 11, corresponding information is detected and transmitted to the control device 51, in particular thanks to devices 94 and/or 93b.

Finally, in the step d4, the control device 51 actuates the pumping means 70 in order to complement the filling of the cistern 11 with the second liquid solution E1, in such a way that the full cistern 11 contains a third liquid solution M3 which is a mixture of the first and second liquid solutions M2 and E1 in predetermined proportions M2/E1.

As such, the system 5 and the method for filling are adapted to selectively fill the cistern 11 with one or the other liquid solution E1, M2, MT (E1+M2) or M3 (MT then E1).

In a step "e", the operator disconnects the means 64, 94 for connecting between the system 5 and the cistern 11 when the desired filling level for the cistern 11 is reached. This level is predetermined and depends in particular on the filling order from the step c, which can correspond to a complete or partial filling of the cistern 11.

More preferably, the steps a, b, c, d and e are successive.

According to an alternative, the step a can be deferred after the steps b, c and d, but before the step e. In this case, this step a consists in incorporating the active material M1 between the first tank 80 and the means for connecting the system for filling 5 to the cistern 11, by the intermediary of the line 66 and devices 96 and 97. In practice, this step a can be selectively deferred by the unit 50.

Generally, implementing the system 5 and/or the associated method for filling makes it possible to fill the cistern 11 in less than three minutes, with a controlled concentration in active material M1 of the phytosanitary product type. Using the mobile trailer 22, comprising the tank 40 and the unit 50 for preparing and for filling, makes it possible to avoid substantial trips for replenishing the sprayer with water while still reducing the risk of polluting roadways along the travel back to the fields.

As such, the output of the sprayer or sprayers is increased, on the one hand, by reducing the time for incorporating active material and for filling the cistern of each sprayer and, on the other hand, by reducing the travel time of each sprayer without spraying to the benefit of actual spraying time in the field or orchard.

The invention claimed is:

1. System for filling a sprayer cistern with at least one liquid solution including a first liquid solution, a second liquid solution, and active material, the system comprising:
   at least one first tank configured to contain the first liquid solution,
   a second tank configured to contain the second liquid solution,
   means for temporarily connecting the system to the cistern,
   means for incorporating the active material into the first tank or between the first tank and the means for connecting,
   a control device, and
   pumping means controlled by the control device and configured to selectively fill the cistern with the first liquid solution or the second liquid solution,
   wherein the system further comprises means for preparing the first liquid solution which are controlled by the control device and which are configured to prepare this first liquid solution in the first tank by mixing the second liquid solution and the active material in predetermined proportions, and wherein the means for preparing the first liquid solution comprise at least,
      the means for incorporating the active material which are positioned between the first tank and the second tank, or
      agitation means configured to maintain the first liquid solution in suspension in the first tank.

2. System according to claim 1 further comprising a unit for preparing and for filling, adapted to incorporate the active material into the system, the unit comprising:
   the control device,
   the first tank,
   the means for incorporating, and
   the pumping means configured to selectively fill the cistern with the first liquid solution or the second liquid solution, in a single process without intermediate manipulations.

3. System according to claim 2, wherein the second tank and the unit for preparing and for filling are mounted on the same trailer.

4. System according to claim 2, wherein the second tank and the unit for preparing and for filling are mounted on separate trailers.

5. System according to, claim 1, wherein the means for preparing the first liquid solution operate while the system is not connected to the cistern by the means for temporarily connecting.

6. System according to claim 1, wherein the system comprises a device for automatically transferring, with a controlling dosing, the active material to the means for incorporating positioned between the first tank and the second tank.

7. System according to claim 1, wherein the at least one liquid solution comprises a third liquid solution, and wherein the system further comprises means for selecting the liquid solution which is sent to the cistern from among at least: the first liquid solution, the second liquid solution and the third liquid solution which is a mixture of the first and second liquid solutions in predetermined proportions.

8. System according to claim 1, wherein the system further comprises means for selecting the liquid solution which is sent to the cistern, with the means for selecting comprising at least:
   means for confluing positioned upstream of the means for temporarily connecting the system to the cistern,
   a first valve device positioned between the first tank containing the first solution and the means for confluing, and
   a second valve device positioned between the second tank containing the second solution and the means for confluing,
   and wherein the control device is configured, on the one hand, to selectively open or close each valve device and, on the other hand, to open or cut off the circulation of a flow of filling in the means for connecting.

9. System according to claim 8, wherein the means for confluing are formed by a Venturi air aspirator.

10. System according to claim 1, the first tank comprises a device for detecting the level of the first liquid solution in suspension in the first tank.

11. System according to claim 1, wherein the control device is provided with communications means which are configured to receive information coming from the cistern, with this information chosen from among the following: the relative position between the system and the cistern, the free volume of the cistern that has to be filled, the liquid solution or solutions selected for the filling of the cistern, the desired concentration in active material in each solution, or a combination thereof.

12. Method for filling a sprayer cistern with a first solution and a second solution, comprising at least the following steps:
   a) incorporating an active material into a system for filling comprising at least a first tank configured to contain the first liquid solution,
   b) connecting the system for filling and the sprayer cistern to be filled using a means for connecting the system for filling to the cistern,
   c) transmitting a filling order to a control device provided on the system for filling,
   d) actuating pumping means that are provided on the system for filling, which are controlled by the control device and which are configured to selectively fill the cistern with the first liquid solution or the second liquid solution, and e) disconnecting the means for connecting between the system and the cistern when the cistern is filled to a predetermined level, wherein the step a) comprises the following sub-steps:

a1) transmitting an order to prepare concentrated mixture to the system for filling, a2) incorporating a predetermined quantity of active material into the system for filling, upstream of the first tank or into the first tank, a3) transferring a predetermined volume of the second liquid solution, to the first tank, and a4) preparing the concentrated mixture in the first tank by mixing the active material and the second liquid solution in predetermined proportions.

13. Method according to claim 12, wherein the step d) comprises at least one sub-step d1) consisting in selecting the liquid solution which is sent to the cistern from among at least: the first liquid solution, the second liquid solution, and a third liquid solution which is a mixture of the first and second liquid solutions in predetermined proportions.

14. Method according to claim 13, wherein when the liquid solution selected is the third liquid solution, the step d) further comprises the following sub-steps following the step d1):

d2) actuating the pumping means using the control device in order to fill the cistern simultaneously with a mixture of the first liquid solution and the second liquid solution, d3) detecting when the first tank containing the first liquid solution is empty or contains a predetermined level of liquid, and transmitting this information to the control device, d4) actuating the pumping means using the control device in order to complement the filling of the cistern with the second liquid solution, in such a way that the full cistern contains a third liquid solution which is a mixture of the first and second liquid solutions in predetermined proportions.

15. Method according to claim 12, wherein the step a) comprises incorporating the active material between the first tank and the means for connecting.

* * * * *